(12) United States Patent
Aisenbrey

(10) Patent No.: US 7,726,440 B2
(45) Date of Patent: Jun. 1, 2010

(54) LOW COST VEHICLE ELECTRICAL AND ELECTRONIC COMPONENTS AND SYSTEMS MANUFACTURED FROM CONDUCTIVE LOADED RESIN-BASED MATERIALS

(75) Inventor: Thomas Aisenbrey, Littleton, CO (US)

(73) Assignee: Integral Technologies, Inc., Bellingham, WA (US)

( * ) Notice: Subject to any disclaimer, the term of this patent is extended or adjusted under 35 U.S.C. 154(b) by 871 days.

(21) Appl. No.: 11/148,044

(22) Filed: Jun. 8, 2005

(65) Prior Publication Data
US 2005/0224280 A1    Oct. 13, 2005

Related U.S. Application Data

(63) Continuation-in-part of application No. 10/877,092, filed on Jun. 25, 2004, now abandoned, which is a continuation of application No. 10/309,429, filed on Dec. 4, 2002, now Pat. No. 6,870,516, which is a continuation-in-part of application No. 10/075,778, filed on Feb. 14, 2002, now Pat. No. 6,741,221.

(60) Provisional application No. 60/578,414, filed on Jun. 9, 2004, provisional application No. 60/317,808, filed on Sep. 7, 2001, provisional application No. 60/269,414, filed on Feb. 16, 2001, provisional application No. 60/268,822, filed on Feb. 15, 2001.

(51) Int. Cl.
*H05K 5/00* (2006.01)

(52) U.S. Cl. .................. 181/148; 181/199; 252/512; 174/388

(58) Field of Classification Search .......... 181/148, 181/199; 252/512; 174/35, 388
See application file for complete search history.

(56) References Cited

U.S. PATENT DOCUMENTS 2,295,483 A * 9/1942 Knowles ............. 381/404

(Continued)

FOREIGN PATENT DOCUMENTS

GB        2377449 A        7/2001

OTHER PUBLICATIONS

Co-pending U.S. Appl. No. 11/148,064, filed Jun. 8, 2005, Low Cost Vehicle Electrical and Electronic Components and Systems Manufactured From Conductive Loaded Resin-Based Materials, assigned to the same assignee as the present invention.

*Primary Examiner*—Jeffrey Donels
*Assistant Examiner*—Forrest M Phillips
(74) *Attorney, Agent, or Firm*—Douglas R. Schnabel

(57) ABSTRACT

Vehicle electrical and electronic components are formed of a conductive loaded resin-based material. The conductive loaded resin-based material comprises micron conductive powder(s), conductive fiber(s), or a combination of conductive powder and conductive fibers in a base resin host. The percentage by weight of the conductive powder(s), conductive fiber(s), or a combination thereof is between about 20% and 50% of the weight of the conductive loaded resin-based material. The micron conductive powders are metals or conductive non-metals or metal plated non-metals. The micron conductive fibers may be metal fiber or metal plated fiber. Further, the metal plated fiber may be formed by plating metal onto a metal fiber or by plating metal onto a non-metal fiber. Any platable fiber may be used as the core for a non-metal fiber. Superconductor metals may also be used as micron conductive fibers and/or as metal plating onto fibers in the present invention.

6 Claims, 10 Drawing Sheets

U.S. PATENT DOCUMENTS

| | | | |
|---|---|---|---|
| 4,496,875 A * | 1/1985 | Barth et al. | 313/632 |
| 4,610,808 A * | 9/1986 | Kleiner | 252/512 |
| 5,093,037 A * | 3/1992 | Ohi et al. | 252/512 |
| 5,206,476 A | 4/1993 | Fresch et al. | 219/202 |
| 5,220,152 A | 6/1993 | Doran | 219/201 |
| 5,304,746 A * | 4/1994 | Purvine | 181/148 |
| 5,406,038 A * | 4/1995 | Reiff et al. | 181/167 |
| 5,430,618 A * | 7/1995 | Huang | 361/818 |
| 5,504,655 A * | 4/1996 | Underwood et al. | 361/707 |
| 5,761,046 A * | 6/1998 | Hein et al. | 361/752 |
| 6,052,472 A * | 4/2000 | Lo | 381/123 |
| 6,117,366 A * | 9/2000 | Park et al. | 252/512 |
| 6,157,546 A * | 12/2000 | Petty et al. | 361/816 |
| 6,238,599 B1 * | 5/2001 | Gelorme et al. | 252/514 |
| 6,369,320 B1 | 4/2002 | Okamoto | 174/50 |
| 6,624,353 B2 * | 9/2003 | Gabower | 174/388 |
| 6,942,060 B2 * | 9/2005 | Sugiura et al. | 181/199 |
| 7,026,382 B2 * | 4/2006 | Akiba et al. | 524/268 |
| 7,142,434 B2 * | 11/2006 | Beihoff et al. | 361/818 |
| 7,338,619 B2 * | 3/2008 | Hagano et al. | 252/500 |
| 7,351,361 B2 * | 4/2008 | Shimizu et al. | 252/512 |
| 2002/0074142 A1 * | 6/2002 | Katz | 174/35 R |
| 2002/0130570 A1 | 9/2002 | Howe et al. | 310/89 |
| 2002/0162672 A1 | 11/2002 | Cook et al. | 174/35 R |
| 2004/0251078 A1 * | 12/2004 | Kung | 181/199 |
| 2005/0006119 A1 * | 1/2005 | Cunningham et al. | 174/35 R |
| 2005/0167188 A1 * | 8/2005 | Aisenbrey | 181/199 |
| 2005/0167189 A1 * | 8/2005 | Aisenbrey | 181/199 |
| 2005/0183871 A1 * | 8/2005 | Hou | 174/35 MS |
| 2005/0192727 A1 * | 9/2005 | Shostak et al. | 701/37 |
| 2005/0224280 A1 * | 10/2005 | Aisenbrey | 181/148 |
| 2005/0230867 A1 * | 10/2005 | Aisenbrey | 264/104 |
| 2005/0247471 A1 * | 11/2005 | Archambeault et al. | 174/35 MS |
| 2007/0278004 A1 * | 12/2007 | Dalzell et al. | 174/388 |
| 2008/0049949 A1 * | 2/2008 | Snider et al. | 381/86 |
| 2008/0067792 A1 * | 3/2008 | Breed | 280/734 |
| 2008/0102294 A1 * | 5/2008 | Kitajima et al. | 428/457 |

* cited by examiner

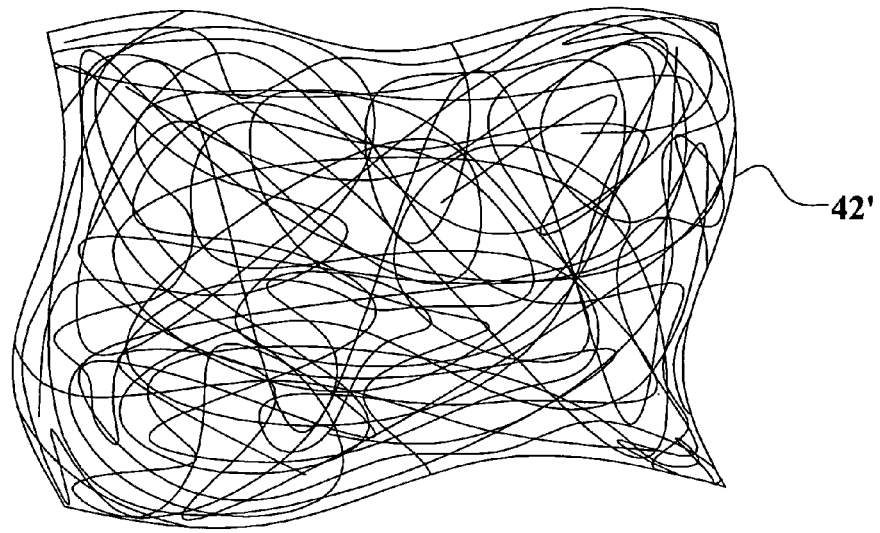
FIG. 5b
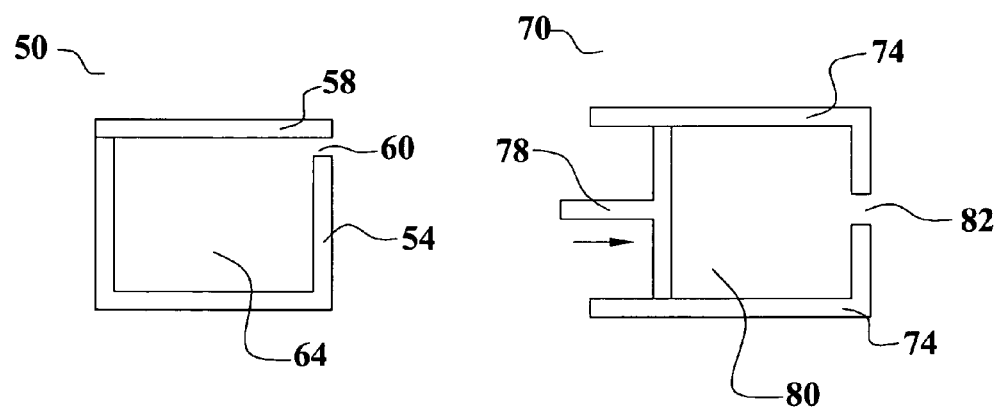
FIG. 6a     FIG. 6b

US 7,726,440 B2

LOW COST VEHICLE ELECTRICAL AND ELECTRONIC COMPONENTS AND SYSTEMS MANUFACTURED FROM CONDUCTIVE LOADED RESIN-BASED MATERIALS

RELATED PATENT APPLICATIONS

This Patent Application is related to U.S. patent application Ser. No. 11/148,064, and filed on Jun. 8, 2005, which is herein incorporated by reference in its entirety.

This patent application claims priority to the U.S. Provisional Patent Application 60/578,414, filed on Jun. 9, 2004, which is herein incorporated by reference in its entirety.

This patent application is a Continuation-in-Part of U.S. patent application Ser. No. 10/877,092, filed on Jun. 25, 2004 now abandoned, which is a Continuation of U.S. patent application Ser. No. 10/309,429, filed on Dec. 4, 2002, now issued as U.S. Pat. No. 6,870,516, also incorporated by reference in its entirety, which is a Continuation-in-Part application of U.S. patent application Ser. No. 10/075,778, filed on Feb. 14, 2002, now issued as U.S. Pat. No. 6,741,221, which claimed priority to U.S. Provisional Patent Application Ser. No. 60/317,808, filed on Sep. 7, 2001, Ser. No. 60/269,414, filed on Feb. 16, 2001, and Ser. No. 60/268,822, filed on Feb. 15, 2001, all of which are incorporated by reference in their entirety.

BACKGROUND OF THE INVENTION (1) Field of the Invention

This invention relates to vehicle electrical and electronic components and, more particularly, to vehicle electrical and electronic components molded of conductive loaded resin-based materials comprising micron conductive powders, micron conductive fibers, or a combination thereof, substantially homogenized within a base resin when molded. This manufacturing process yields a conductive part or material usable within the EMF, thermal, acoustic, or electronic spectrum(s).

(2) Description of the Prior Art

Modern motor vehicles, including passenger cars, light and heavy-duty trucks, SUVs, and the like, rely heavily on electrical and electronic components. For example, vehicle control systems, engine management systems, entertainment and comfort systems are all based around electrical, electronic, and electromechanical devices. These systems require, in various forms, conductive wiring and contacts, heat dissipation structures, electromagnetic energy absorbing/shielding structures, antennas, electrical current limiting devices, heating elements, magnetic devices, and acoustic structures. A variety of materials are currently used to provide these structures and devices. It is a primary objective of the present invention to provide a material that is capable of use in a variety of these vehicle applications.

Several prior art inventions relate to vehicle electrical and electronic components. U.S. Pat. No. 5,206,476 to Fresch et al teaches a HVAC air heating device for a motor vehicle. The device comprises a conductive plastic formed into an air duct. In one embodiment, a polycarbonate is filled stainless steel fibers. This appears close to the invention. U.S. Pat. No. 6,369,320 to Okamoto teaches an enclosure for an electronics device. An electrically conductive rubber or resin is used to make a belt or seal to electrically connect the enclosure top and bottom plates to improve EMI protection. U.S. Pat. No. 5,220,152 to Doran teaches a device to thaw keylock mechanisms as used on motor vehicles. The device comprises a rechargeable battery, a heating element, and an insertion blade. The heated insertion blade is inserted into the keylock to achieve thawing. U.S. patent application Publication 2002/0130570 to Howe et al teaches an alternator as used on motor vehicles. The outer enclosure, or frame, of the alternator comprises a plastic material. In one embodiment, a conductive plastic comprising a carbon fiber fill is used. U.S. patent application Publication 2002/0162672 to Cook et al teaches an enclosure for an electrical device. The enclosure comprises a polymer with filler such as nickel, carbon fiber, or aluminum.

SUMMARY OF THE INVENTION

A principal object of the present invention is to provide effective vehicle electrical and electronics components.

A further object of the present invention is to provide a method to form vehicle electrical and electronic components.

A further object of the present invention is to provide effective vehicle electrical and electronic components with conductive loaded resin-based material conductors.

A further object of the present invention is to provide effective vehicle electrical and electronic components with conductive loaded resin-based material heating elements.

A further object of the present invention is to provide effective vehicle electrical and electronic components with conductive loaded resin-based material heat dissipating devices.

A further object of the present invention is to provide effective vehicle electrical and electronic components with conductive loaded resin-based material antennas.

A further object of the present invention is to provide effective vehicle electrical and electronic components with conductive loaded resin-based material electromagnetic energy absorbers.

A yet further object of the present invention is to provide vehicle electrical and electronic components molded of conductive loaded resin-based material where the electrical, thermal, or electromagnetic characteristics can be altered or the visual characteristics can be altered by forming a metal layer over the conductive loaded resin-based material.

A yet further object of the present invention is to provide methods to fabricate vehicle electrical and electronic components from a conductive loaded resin-based material incorporating various forms of the material.

In accordance with the objects of this invention, a vehicle electrical component device is achieved. The device comprises a conductive loaded, resin-based material comprising conductive materials in a base resin host. The percent by weight of the conductive materials is between about 20% and about 50% of the total weight of the conductive loaded resin-based material.

Also in accordance with the objects of this invention, a vehicle electrical component device is achieved. The device comprises a conductive loaded, resin-based material comprising conductive materials in a base resin host. The percent by weight of the conductive materials is between about 20% and about 40% of the total weight of the conductive loaded resin-based material.

Also in accordance with the objects of this invention, a vehicle electrical component device is achieved. The device comprises a conductive loaded, resin-based material comprising micron conductive fiber in a base resin host. The percent by weight of the micron conductive fiber is between about 20% and about 50% of the total weight of the conductive loaded resin-based material.

Also in accordance with the objects of this invention, a method to form a vehicle electrical component is achieved. The method comprises providing a conductive loaded, resin-based material comprising conductive materials in a resin-based host. The percent by weight of the conductive materials is between about 20% and about 50% of the total weight of the conductive loaded resin-based material. The conductive loaded, resin-based material is molded into a vehicle electrical component.

Also in accordance with the objects of this invention, a method to form a vehicle electrical component is achieved. The method comprises providing a conductive loaded, resin-based material comprising conductive materials in a resin-based host. The percent by weight of the conductive materials is between 20% and 40% of the total weight of the conductive loaded resin-based material. The conductive loaded, resin-based material is molded into a vehicle electrical component.

Also in accordance with the objects of this invention, a method to form a vehicle electrical component is achieved. The method comprises providing a conductive loaded, resin-based material comprising micron conductive fiber in a resin-based host. The percent by weight of the micron conductive fiber is between 20% and 50% of the total weight of the conductive loaded resin-based material. The conductive loaded, resin-based material is molded into a vehicle electrical component.

BRIEF DESCRIPTION OF THE DRAWINGS

In the accompanying drawings forming a material part of this description, there is shown:

FIGS. 5a and 5b illustrate a fourth preferred embodiment wherein conductive fabric-like materials are formed from the conductive loaded resin-based material.

FIGS. 6a and 6b illustrate, in simplified schematic form, an injection molding apparatus and an extrusion molding apparatus that may be used to mold vehicle electrical and electronic components of a conductive loaded resin-based material.

DESCRIPTION OF THE PREFERRED EMBODIMENTS

Figure 1:
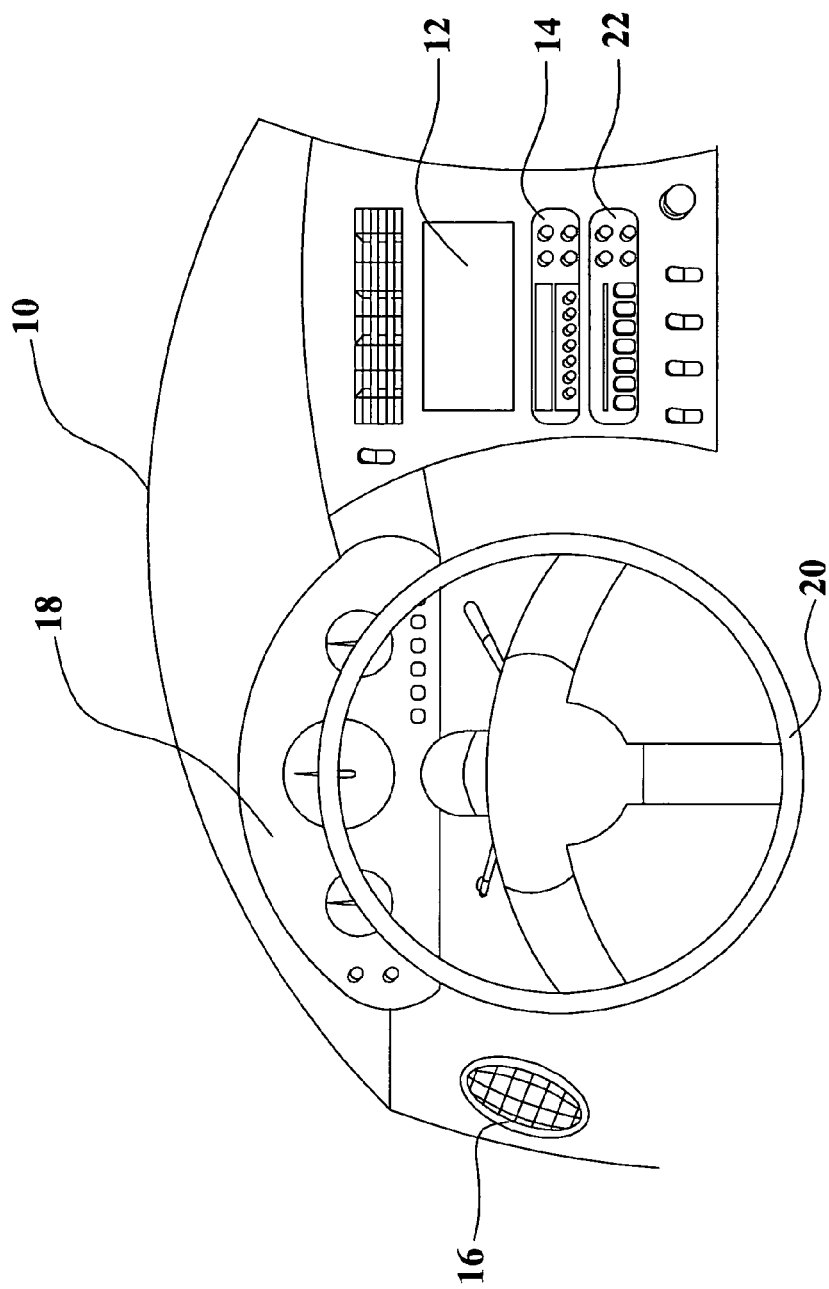
FIG. 1 illustrates a first preferred embodiment of the present invention showing a vehicle instrument panel having various components comprising conductive loaded resin-based material according to the present invention.

This invention relates to vehicle electrical and electronic components molded of conductive loaded resin-based materials comprising micron conductive powders, micron conductive fibers, or a combination thereof, substantially homogenized within a base resin when molded.

The conductive loaded resin-based materials of the invention are base resins loaded with conductive materials, which then makes any base resin a conductor rather than an insulator. The resins provide the structural integrity to the molded part. The micron conductive fibers, micron conductive powders, or a combination thereof, are substantially homogenized within the resin during the molding process, providing the electrical continuity.

The conductive loaded resin-based materials can be molded, extruded or the like to provide almost any desired shape or size. The molded conductive loaded resin-based materials can also be cut, stamped, or vacuumed formed from an injection molded or extruded sheet or bar stock, over-molded, laminated, milled or the like to provide the desired shape and size. The thermal or electrical conductivity characteristics of vehicle electrical and electronic components fabricated using conductive loaded resin-based materials depend on the composition of the conductive loaded resin-based materials, of which the loading or doping parameters can be adjusted, to aid in achieving the desired structural, electrical or other physical characteristics of the material. The selected materials used to fabricate the vehicle electrical and electronic components are substantially homogenized together using molding techniques and or methods such as injection molding, over-molding, insert molding, thermo-set, protrusion, extrusion, calendaring, or the like. Characteristics related to 2D, 3D, 4D, and 5D designs, molding and electrical characteristics, include the physical and electrical advantages that can be achieved during the molding process of the actual parts and the polymer physics associated within the conductive networks within the molded part(s) or formed material(s).

In the conductive loaded resin-based material, electrons travel from point to point when under stress, following the path of least resistance. Most resin-based materials are insulators and represent a high resistance to electron passage. The doping of the conductive loading into the resin-based material alters the inherent resistance of the polymers. At a threshold concentration of conductive loading, the resistance through the combined mass is lowered enough to allow electron movement. Speed of electron movement depends on conductive loading concentration, that is, the separation between the conductive loading particles. Increasing conductive loading content reduces interparticle separation distance, and, at a critical distance known as the percolation point, resistance decreases dramatically and electrons move rapidly.

Resistivity is a material property that depends on the atomic bonding and on the microstructure of the material. The atomic microstructure material properties within the conductive loaded resin-based material are altered when molded into a structure. A substantially homogenized conductive microstructure of delocalized valance electrons is created. This microstructure provides sufficient charge carriers within the molded matrix structure. As a result, a low density, low resistivity, lightweight, durable, resin based polymer microstructure material is achieved. This material exhibits conductivity comparable to that of highly conductive metals such as silver, copper or aluminum, while maintaining the superior structural characteristics found in many plastics and rubbers or other structural resin based materials.

The use of conductive loaded resin-based materials in the fabrication of vehicle electrical and electronic components significantly lowers the cost of materials and the design and manufacturing processes used to hold ease of close tolerances, by forming these materials into desired shapes and sizes. The vehicle electrical and electronic components can be manufactured into infinite shapes and sizes using conventional forming methods such as injection molding, over-molding, or extrusion, calendaring, or the like. The conductive loaded resin-based materials, when molded, typically but not exclusively produce a desirable usable range of resistivity from between about 5 and 25 ohms per square, but other resistivities can be achieved by varying the doping parameters and/or resin selection(s).

The conductive loaded resin-based materials comprise micron conductive powders, micron conductive fibers, or any combination thereof, which are substantially homogenized together within the base resin, during the molding process, yielding an easy to produce low cost, electrically conductive, close tolerance manufactured part or circuit. The resulting molded article comprises a three dimensional, continuous network of conductive loading and polymer matrix. Exemplary micron conductive powders include carbons, graphites, amines or the like, and/or of metal powders such as nickel, copper, silver, aluminum, or plated or the like. The use of carbons or other forms of powders such as graphite(s) etc. can create additional low level electron exchange and, when used in combination with micron conductive fibers, creates a micron filler element within the micron conductive network of fiber(s) producing further electrical conductivity as well as acting as a lubricant for the molding equipment. The addition of conductive powder to the micron conductive fiber loading may increase the surface conductivity of the molded part, particularly in areas where a skinning effect occurs during molding.

The micron conductive fibers may be metal fiber or metal plated fiber. Further, the metal plated fiber may be formed by plating metal onto a metal fiber or by plating metal onto a non-metal fiber. Exemplary metal fibers include, but are not limited to, stainless steel fiber, copper fiber, nickel fiber, silver fiber, aluminum fiber, or the like, or combinations thereof. Exemplary metal plating materials include, but are not limited to, copper, nickel, cobalt, silver, gold, palladium, platinum, ruthenium, and rhodium, and alloys of thereof. Any platable fiber may be used as the core for a non-metal fiber. Exemplary non-metal fibers include, but are not limited to, carbon, graphite, polyester, basalt, man-made and naturally-occurring materials, and the like. In addition, superconductor metals, such as titanium, nickel, niobium, and zirconium, and alloys of titanium, nickel, niobium, and zirconium may also be used as micron conductive fibers and/or as metal plating onto fibers in the present invention.

The structural material is a material such as any polymer resin. Structural material can be, here given as examples and not as an exhaustive list, polymer resins produced by GE PLASTICS, Pittsfield, Mass., a range of other plastics produced by GE PLASTICS, Pittsfield, Mass., a range of other plastics produced by other manufacturers, silicones produced by GE SILICONES, Waterford, N.Y., or other flexible resin-based rubber compounds produced by other manufacturers.

The resin-based structural material loaded with micron conductive powders, micron conductive fibers, or in combination thereof can be molded, using conventional molding methods such as injection molding or over-molding, or extrusion, or calendaring, to create desired shapes and sizes. The molded conductive loaded resin-based materials can also be stamped, cut or milled as desired to form create the desired shape form factor(s) of the vehicle electrical and electronic components. The doping composition and directionality associated with the micron conductors within the loaded base resins can affect the electrical and structural characteristics of the vehicle electrical and electronic components and can be precisely controlled by mold designs, gating and or protrusion design(s) and or during the molding process itself. In addition, the resin base can be selected to obtain the desired thermal characteristics such as very high melting point or specific thermal conductivity.

A resin-based sandwich laminate could also be fabricated with random or continuous webbed micron stainless steel fibers or other conductive fibers, forming a cloth like material. The webbed conductive fiber can be laminated or the like to materials such as Teflon, Polyesters, or any resin-based flexible or solid material(s), which when discretely designed in fiber content(s), orientation(s) and shape(s), will produce a very highly conductive flexible cloth-like material. Such a cloth-like material could also be used in forming vehicle electrical and electronic components of rubber(s) or plastic (s). When using conductive fibers as a webbed conductor as part of a laminate or cloth-like material, the fibers may have diameters of between about 3 and 12 microns, typically between about 8 and 12 microns or in the range of about 10 microns, with length(s) that can be seamless or overlapping.

The conductive loaded resin-based material of the present invention can be made resistant to corrosion and/or metal electrolysis by selecting micron conductive fiber and/or micron conductive powder and base resin that are resistant to corrosion and/or metal electrolysis. For example, if a corrosion/electrolysis resistant base resin is combined with stainless steel fiber and carbon fiber/powder, then a corrosion and/or metal electrolysis resistant conductive loaded resin-based material is achieved. Another additional and important feature of the present invention is that the conductive loaded resin-based material of the present invention may be made flame retardant. Selection of a flame-retardant (FR) base resin material allows the resulting product to exhibit flame retardant capability. This is especially important in vehicle electrical and electronic component applications as described herein.

The substantially homogeneous mixing of micron conductive fiber and/or micron conductive powder and base resin described in the present invention may also be described as doping. That is, the substantially homogeneous mixing converts the typically non-conductive base resin material into a conductive material. This process is analogous to the doping process whereby a semiconductor material, such as silicon, can be converted into a conductive material through the introduction of donor/acceptor ions as is well known in the art of semiconductor devices. Therefore, the present invention uses the term doping to mean converting a typically non-conductive base resin material into a conductive material through the substantially homogeneous mixing of micron conductive fiber and/or micron conductive powder into a base resin.

As an additional and important feature of the present invention, the molded conductor loaded resin-based material exhibits excellent thermal dissipation characteristics. Therefore, vehicle electrical and electronic components manufactured from the molded conductor loaded resin-based material can provide added thermal dissipation capabilities to the application. For example, heat can be dissipated from electrical devices physically and/or electrically connected to vehicle electrical and electronic components of the present invention.

As a significant advantage of the present invention, vehicle electrical and electronic components constructed of the conductive loaded resin-based material can be easily interfaced to an electrical circuit or grounded. In one embodiment, a wire can be attached to a conductive loaded resin-based vehicle electrical and electronic components via a screw that is fastened to the component. For example, a simple sheet-metal type, self tapping screw, when fastened to the material, can achieve excellent electrical connectivity via the conductive matrix of the conductive loaded resin-based material. To facilitate this approach a boss may be molded into the conductive loaded resin-based material to accommodate such a screw. Alternatively, if a solderable screw material, such as copper, is used, then a wire can be soldered to the screw that is embedded into the conductive loaded resin-based material. In another embodiment, the conductive loaded resin-based material is partly or completely plated with a metal layer. The metal layer forms excellent electrical conductivity with the conductive matrix. A connection of this metal layer to another circuit or to ground is then made. For example, if the metal layer is solderable, then a soldered connection may be made between the vehicle electrical and electronic component and a grounding wire.

Where a metal layer is formed over the surface of the conductive loaded resin-based material, any of several techniques may be used to form this metal layer. This metal layer may be used for visual enhancement of the molded conductive loaded resin-based material article or to otherwise alter performance properties. Well-known techniques, such as electroless metal plating, electro metal plating, metal vapor deposition, metallic painting, or the like, may be applied to the formation of this metal layer. If metal plating is used, then the resin-based structural material of the conductive loaded, resin-based material is one that can be metal plated. There are many of the polymer resins that can be plated with metal layers. For example, GE Plastics, SUPEC, VALOX, ULTEM, CYCOLAC, UGIKRAL, STYRON, CYCOLOY are a few resin-based materials that can be metal plated. Electroless plating is typically a multiple-stage chemical process where, for example, a thin copper layer is first deposited to form a conductive layer. This conductive layer is then used as an electrode for the subsequent plating of a thicker metal layer.

A typical metal deposition process for forming a metal layer onto the conductive loaded resin-based material is vacuum metallization. Vacuum metallization is the process where a metal layer, such as aluminum, is deposited on the conductive loaded resin-based material inside a vacuum chamber. In a metallic painting process, metal particles, such as silver, copper, or nickel, or the like, are dispersed in an acrylic, vinyl, epoxy, or urethane binder. Most resin-based materials accept and hold paint well, and automatic spraying systems apply coating with consistency. In addition, the excellent conductivity of the conductive loaded resin-based material of the present invention facilitates the use of extremely efficient, electrostatic painting techniques.

The conductive loaded resin-based material can be contacted in any of several ways. In one embodiment, a pin is embedded into the conductive loaded resin-based material by insert molding, ultrasonic welding, pressing, or other means. A connection with a metal wire can easily be made to this pin and results in excellent contact to the conductive loaded resin-based material. In another embodiment, a hole is formed in to the conductive loaded resin-based material either during the molding process or by a subsequent process step such as drilling, punching, or the like. A pin is then placed into the hole and is then ultrasonically welded to form a permanent mechanical and electrical contact. In yet another embodiment, a pin or a wire is soldered to the conductive loaded resin-based material. In this case, a hole is formed in the conductive loaded resin-based material either during the molding operation or by drilling, stamping, punching, or the like. A solderable layer is then formed in the hole. The solderable layer is preferably formed by metal plating. A conductor is placed into the hole and then mechanically and electrically bonded by point, wave, or reflow soldering.

Another method to provide connectivity to the conductive loaded resin-based material is through the application of a solderable ink film to the surface. One exemplary solderable ink is a combination of copper and solder particles in an epoxy resin binder. The resulting mixture is an active, screen-printable and dispensable material. During curing, the solder reflows to coat and to connect the copper particles and to thereby form a cured surface that is directly solderable without the need for additional plating or other processing steps. Any solderable material may then be mechanically and/or electrically attached, via soldering, to the conductive loaded resin-based material at the location of the applied solderable ink. Many other types of solderable inks can be used to provide this solderable surface onto the conductive loaded resin-based material of the present invention. Another exemplary embodiment of a solderable ink is a mixture of one or more metal powder systems with a reactive organic medium. This type of ink material is converted to solderable pure metal during a low temperature cure without any organic binders or alloying elements.

A ferromagnetic conductive loaded resin-based material may be formed of the present invention to create a magnetic or magnetizable form of the material. Ferromagnetic micron conductive fibers and/or ferromagnetic conductive powders are mixed with the base resin. Ferrite materials and/or rare earth magnetic materials are added as a conductive loading to the base resin. With the substantially homogeneous mixing of the ferromagnetic micron conductive fibers and/or micron conductive powders, the ferromagnetic conductive loaded resin-based material is able to produce an excellent low cost, low weight magnetize-able item. The magnets and magnetic devices of the present invention can be magnetized during or after the molding process. The magnetic strength of the magnets and magnetic devices can be varied by adjusting the amount of ferromagnetic micron conductive fibers and/or ferromagnetic micron conductive powders that are incorporated with the base resin. By increasing the amount of the ferromagnetic doping, the strength of the magnet or magnetic devices is increased. The substantially homogenous mixing of the conductive fiber network allows for a substantial amount of fiber to be added to the base resin without causing the structural integrity of the item to decline. The ferromagnetic conductive loaded resin-based magnets display the excellent physical properties of the base resin, including flexibility, moldability, strength, and resistance to environmental corrosion, along with excellent magnetic ability. In addition, the unique ferromagnetic conductive loaded resin-based material facilitates formation of items that exhibit excellent thermal and electrical conductivity as well as magnetism.

A high aspect ratio magnet is easily achieved through the use of ferromagnetic conductive micron fiber or through the combination of ferromagnetic micron powder with conductive micron fiber. The use of micron conductive fiber allows for molding articles with a high aspect ratio of conductive fiber to cross sectional area. If a ferromagnetic micron fiber is used, then this high aspect ratio translates into a high quality magnetic article. Alternatively, if a ferromagnetic micron powder is combined with micron conductive fiber, then the magnetic effect of the powder is effectively spread throughout the molded article via the network of conductive fiber such that an effective high aspect ratio molded magnetic article is achieved. The ferromagnetic conductive loaded resin-based material may be magnetized, after molding, by exposing the molded article to a strong magnetic field. Alternatively, a strong magnetic field may be used to magnetize the ferromagnetic conductive loaded resin-based material during the molding process.

The ferromagnetic conductive loading is in the form of fiber, powder, or a combination of fiber and powder. The micron conductive powder may be metal fiber or metal plated fiber. If metal plated fiber is used, then the core fiber is a platable material and may be metal or non-metal. Exemplary ferromagnetic conductive fiber materials include ferrite, or ceramic, materials as nickel zinc, manganese zinc, and combinations of iron, boron, and strontium, and the like. In addition, rare earth elements, such as neodymium and samarium, typified by neodymium-iron-boron, samarium-cobalt, and the like, are useful ferromagnetic conductive fiber materials. Exemplary ferromagnetic micron powder leached onto the conductive fibers include ferrite, or ceramic, materials as nickel zinc, manganese zinc, and combinations of iron, boron, and strontium, and the like. In addition, rare earth elements, such as neodymium and samarium, typified by neodymium-iron-boron, samarium-cobalt, and the like, are useful ferromagnetic conductive powder materials. A ferromagnetic conductive loading may be combined with a non-ferromagnetic conductive loading to form a conductive loaded resin-based material that combines excellent conductive qualities with magnetic capabilities.

Referring now to FIG. 1, a first preferred embodiment of the present invention is illustrated. An instrumentation panel for a motor vehicle is illustrated. Several vehicle electrical and electronics components and systems comprising, at least in part, the conductive loaded resin-based material are in the passenger compartment. For example, the instrument panel (I/P) 18, gage panel, display panel 12, radio 14, HVAC interface 22, and speakers 16 comprise, in part, the conductive loaded resin-based material. In all of these examples, the vehicle electrical and electronics components and systems use the conductive loaded resin-based material in any, or all, of the following ways.

Figure 7:
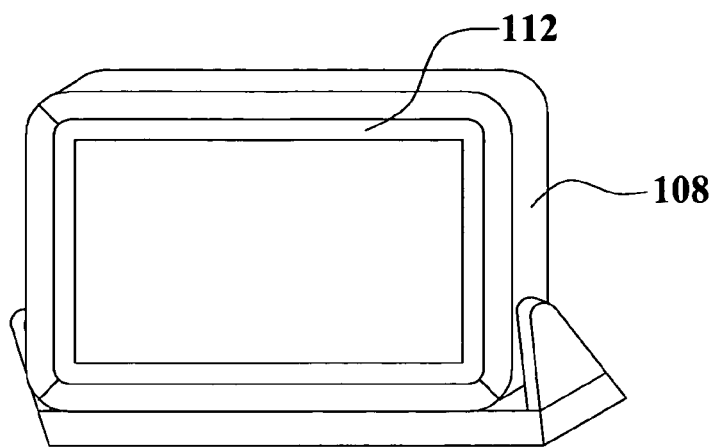
FIG. 7 illustrates a second preferred embodiment of the present invention showing a vehicle display panel having various components comprising conductive loaded resin-based material according to the present invention.

First, enclosures of any of these components/systems are formed of the conductive loaded resin-based material. Referring now to FIG. 7, a display interface, such as would be used to display mapping, global positioning system (GPS), digital video (DVD), or other data, comprises an enclosure case 108 and 112 of the conductive loaded resin-based material. This case 108 and 112 provides excellent electromagnetic interference (EMI) absorption both of external sources interfering with the display and of the display interfering with other devices in the vehicle. This is a significant advantage over typical non-conductive plastic enclosures that provide no EMI protection. The conductive loaded resin-based material is easily molded by, for example, injection molding to form the enclosure.

Figure 8:
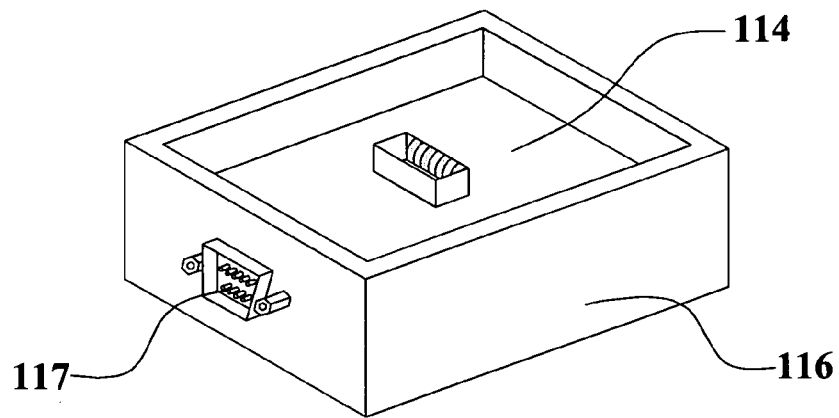
FIG. 8 illustrates a third preferred embodiment of the present invention showing a vehicle electronic controller having various components comprising conductive loaded resin-based material according to the present invention.

Referring now to FIG. 8, an electronics system, such as an engine controller or antilock braking system, is illustrated. In this example, the case 116 of conductive loaded resin-based material encloses a system electronics board 114. In addition to EMI absorption, the case 116 provides environmental protection from moisture and contamination and provides mechanical mounting and vibration protection. Further, the conductive loaded resin-based material provides a case 116 that acts as a large ground plane, if desired, due to the conductivity of the material. Significantly, this conductive case 116 is substantially lighter then metal. The conductive loaded resin-based material is easily moldable and results in a more hermetically sealed case than a stamped metal part.

Figure 9:
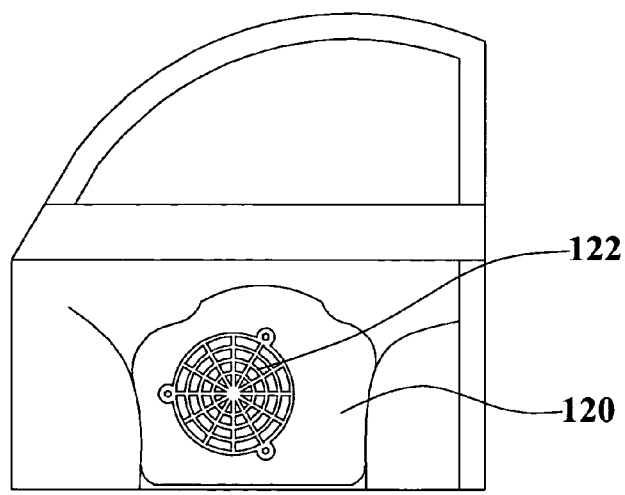
FIG. 9 illustrates a fourth preferred embodiment of the present invention showing a vehicle speaker enclosure having various components comprising conductive loaded resin-based material according to the present invention.

Referring now to FIG. 9, a speaker enclosure 120 is constructed of the conductive loaded resin-based material according to the present invention. The speaker 122, as would be used in a vehicle sound system, is enclosed except for the front surface. The enclosure 120 may additionally house electronics, such as an amplifier, useful for driving the speaker 122. The conductive loaded resin-based material of the present invention provides excellent acoustical dampening properties to control the speaker 122 performance within the vehicle passenger compartment. In another embodiment, the speaker basket may be molded of the conductive loaded resin-based material. This speaker basket will aid in removing heat from the speaker coil.

Figure 17:
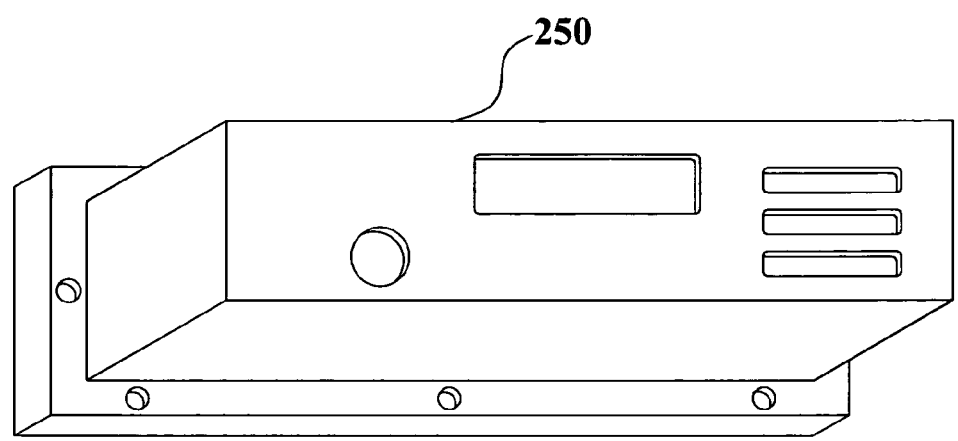
FIG. 17 illustrates a tenth preferred embodiment of the present invention showing a vehicle electronics enclosure having comprising conductive loaded resin-based material according to the present invention.

Referring now to FIG. 17, a radio enclosure 250 of the conductive loaded resin-based material is illustrated. This radio enclosure 250 provides mechanical protection to the radio 104 as shown, for example, in FIG. 1. Other electronics components, such as displays, HVAC controllers, communications devices, and the like may be housed in such an enclosure. Referring again to FIG. 17, the radio enclosure 250 further provides EMI absorption to prevent interference of, for example, engine electrical signals with the vehicle radio performance. The radio enclosure 250 is easily molded of the conductive loaded resin-based material to provide a lower weight and easily manufacturable alternative to stamped metal enclosures while providing significant performance advantages over typical plastic enclosures. The radio enclosure is easily connected to the vehicle ground using methods described above, such as attaching a grounding wire via a screw, metal plating and soldering, and the like.

Figure 10:
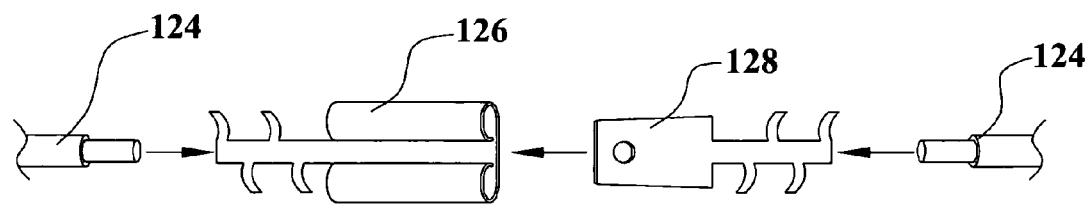
FIGS. 10 and 11 illustrate a fifth preferred embodiment of the present invention showing vehicle electrical wiring and connectors having various components comprising conductive loaded resin-based material according to the present invention.
Figure 11:
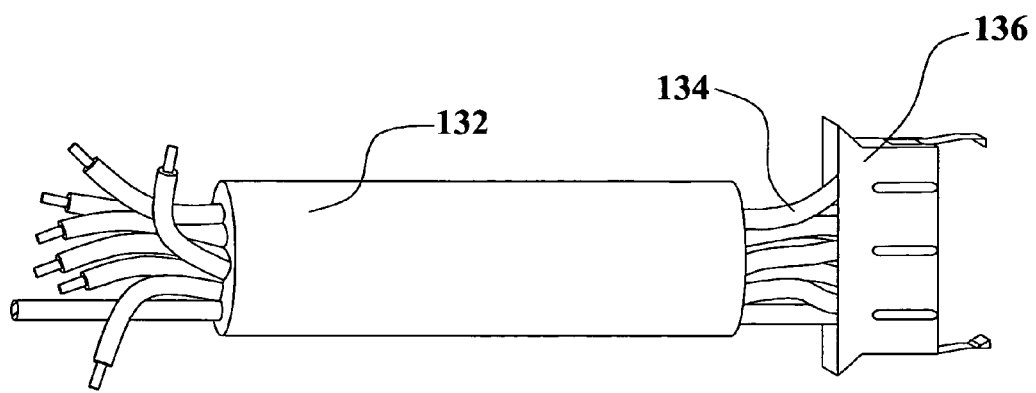

Second, wires, wiring harnesses, connectors, cables, and the like for any, or all, of the vehicle electrical and electronics components and systems are formed, at least in part, of the conductive loaded resin-based material of the present invention. Referring now to FIGS. 10 and 11, examples of wires, wiring harnesses, connectors, and cables are illustrated. Referring particularly to FIG. 10, two signal, power, or ground wires 124 are shown. Where necessary, separate wires 124 are connected by means of mated couplings 126 and 128. In the present invention, the wires 124 comprise a conductive core of the conductive loaded resin-based material. For example, the conductive loaded resin-based material is extruded to form long conductive strands. An insulating layer is then co-extruded over the core conductor or is spray, dipped, or coated over the core conductor. This insulating layer preferably comprises the same base resin material as is used in the conductive loaded resin-based material of the core to achieve optimal bonding.

The mated couplings 126 and 128 comprise conductive loaded resin-based material that is molded to the desired shape(s). Alternatively, a metal layer may be formed over the molded couplings 126 and 128 to provide optimal appearance or to tailor the thermal or electrical conductivity. If used, the metal layer may be formed by plating or by coating. If the method of formation is metal plating, then the resin-based structural material of the conductive loaded, resin-based material is one that can be metal plated. There are very many of the polymer resins that can be plated with metal layers. For example, GE Plastics, SUPEC, VALOX, ULTEM, CYCOLAC, UGIKRAL, STYRON, CYCOLOY are a few resin-based materials that can be metal plated. The metal layer may be formed by, for example, electroplating or physical vapor deposition.

A plurality of conductive loaded resin-based wires 134 is then combined to form a cable or harness 132 of wires in FIG. 11. The wiring harness is then easily routed through the vehicle to provide signal connectivity between major components and systems. In this application, a flexible base resin material is chosen for the conductive loaded resin-based core conductor of each wire. The wires are terminated at wiring connectors or terminals 136. These wiring connectors 136 provide a method to easily connector/disconnect a group of wires to/from a vehicle electronics system component. The wiring connector 136 comprises a plurality of terminals each mechanically and electrically clamping onto a single wire 134 in the harness 132. These clamping terminals then mechanically and electrically couple onto terminals or pins of the electronics system such as are shown in FIG. 8 as the connector 117. The wiring harness connector terminals in the wiring connector 136 and/or the component connector 117 pins are formed of the conductive loaded resin-based material. In addition to signal wires and harnesses, battery and ground cables and connectors are formed of the conductive loaded resin-based material according to another embodiment of the present invention. The use of the conductive loaded resin-based material of the present invention to form wires, wiring harnesses, connectors, and the like, facilitates significant vehicle weight savings over copper/aluminum-based wiring systems of the prior art.

Third, vehicle electronics components are formed with substrates or wiring boards 114, as shown in FIG. 8, comprising, at least in part, the conductive loaded resin-based material of the present invention. In this embodiment, conductive circuits are formed of the conductive loaded resin-based material. For example, the substrate 114 may comprises a laminate of insulating layers, such as non-conductive resins, and conductive layers of the conductive loaded resin-based material where the conductive loaded resin-based material is further patterned to form the desired circuit paths. Alternatively, mechanical structures, such as enclosures, are formed of the conductive loaded resin-based material and then used as part of the circuit path.

Fourth, heat dissipation devices and structures for vehicle electrical and electronics components and systems, such as heat sinks, heat pipes, and the like, are formed of the conductive loaded resin-based material according to the present invention. The excellent thermal conductivity of the conductive loaded resin-based material allows efficient heat dissipation devices to be molded. These heat dissipation devices can be made lighter than comparable metal devices and, further, can be molded into substrates and enclosures to achieved improved manufacturability and reduced part count.

Figure 16:
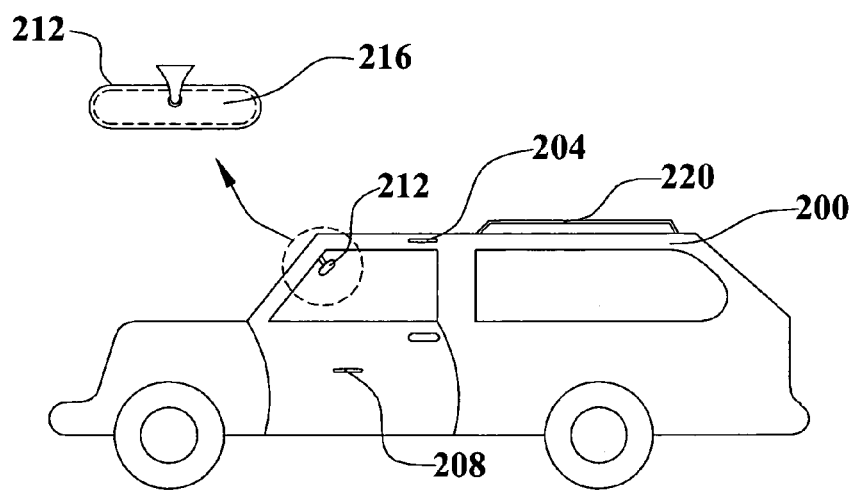
FIG. 16 illustrates a ninth preferred embodiment of the present invention showing a vehicle having various components comprising conductive loaded resin-based material according to the present invention.

Fifth, antennas can easily be molded into various vehicle structures and electrical/electronics components and systems. Referring now to FIG. 16, an exemplary vehicle 200 is shown with a conductive loaded resin-based antenna 208 molded into the door. Another antenna 204 is molded into the roof. Still another antenna is molded into a luggage rack 220. Another antenna is molded into the structure 216 of the interior rear-view mirror 212. The conductive loaded resin-based material of the present invention provides superior electromagnetic absorption properties and, further, provides an antenna material that can be easily and optimally tuned, that can take on an infinite variety of shapes, that can withstand harsh vehicle environments without corrosion or mechanical damage, and that can be easily incorporated into other structures especially through molding techniques. These conductive loaded resin-based antennas 208, 204, and 216 provide excellent transmission/reception for a variety of entertainment (radio, video) and communication (phone, GPS, internet) applications within the vehicle over a large range of operating frequencies.

Figure 13:
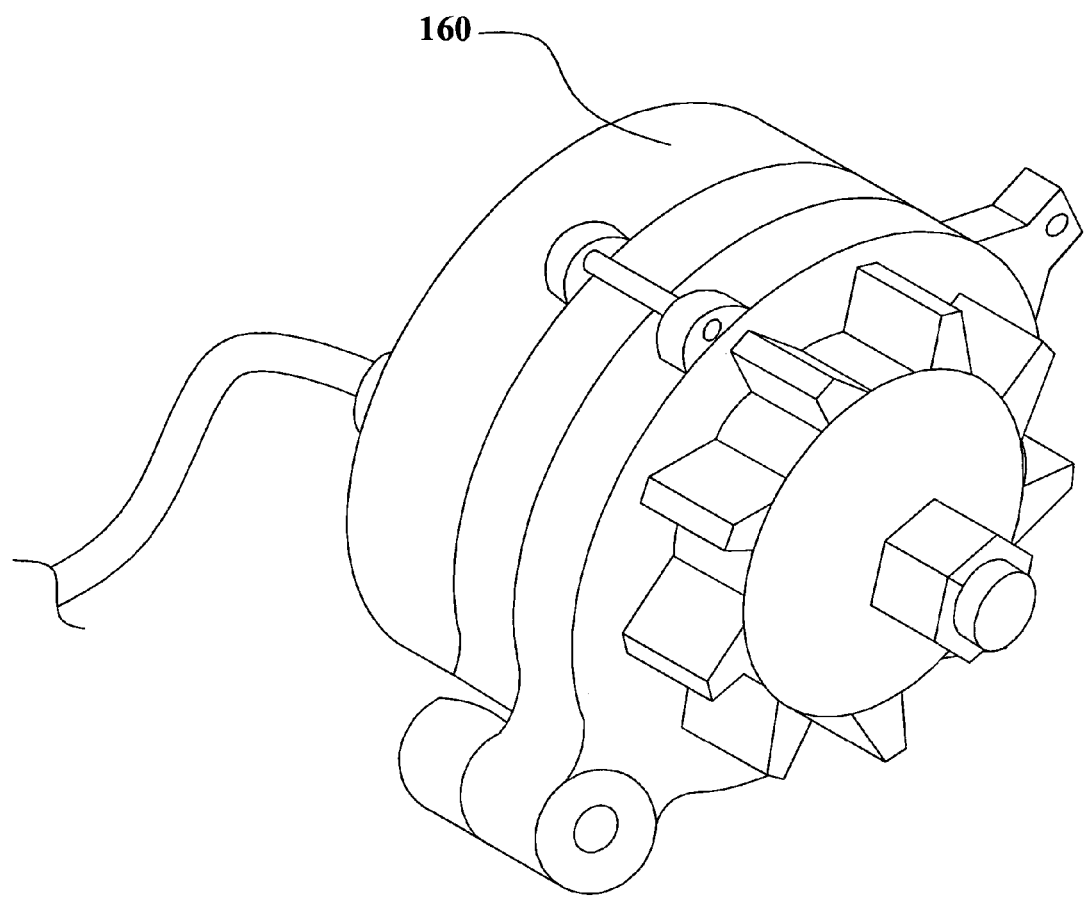
FIG. 13 illustrates a seventh preferred embodiment of the present invention showing a vehicle alternator having various components comprising conductive loaded resin-based material according to the present invention.

Sixth, the conductive loaded resin-based material is used for housings, for conductive brushes, and for rotors, in electrical generation and electrical motor applications in the vehicle. Referring now to FIG. 13, an alternator 160 is shown. The alternator converts rotational energy provided by the vehicle engine into electrical energy for use in the vehicle ignition system and electrical/electronics components and for maintaining charge on the vehicle battery. Typically, alternators comprise a metal case, metal or carbon-based brushes, and a metal rotor. In this embodiment, any or all of these components of the alternator 160 are formed of the conductive loaded resin-based material. The conductive loaded resin-based material provides several distinct advantages in this application. First, a significant weight savings is achieved over metal, especially for the alternator case 160. Second, the sound absorbing properties of the conductive loaded resin-based material will reduce the noise emitted from the alternator 160 during operation. Third, the EMI absorbing capability of the conductive loaded resin-based material will reduce the EMI emitted from the operating alternator 160. Finally, the thermal conductivity and electrical conductivity of the conductive loaded resin-based material will allow facilitate thermal dissipation and circuit grounding functions.

Similarly, in this embodiment of the present invention, the conductive loaded resin-based material is applied to various electric motors used in the vehicle. For example, electric motors are used to control engine intake and exhaust recirculation functions as part of emission control systems, to control HVAC air flow, to control ABS systems, to actuate electric steering by wire systems, to move automated doors and retractable roofs, to open/close CD and DVD holders, to move power seats, windows, tilt steering wheels, mirrors, and the like, to actuate the engine cooling fan, etc. The conductive loaded resin-based material is similarly used for cases, brushes, and rotors in any or all of these alternative electric motor applications within the vehicle.

Figure 12:
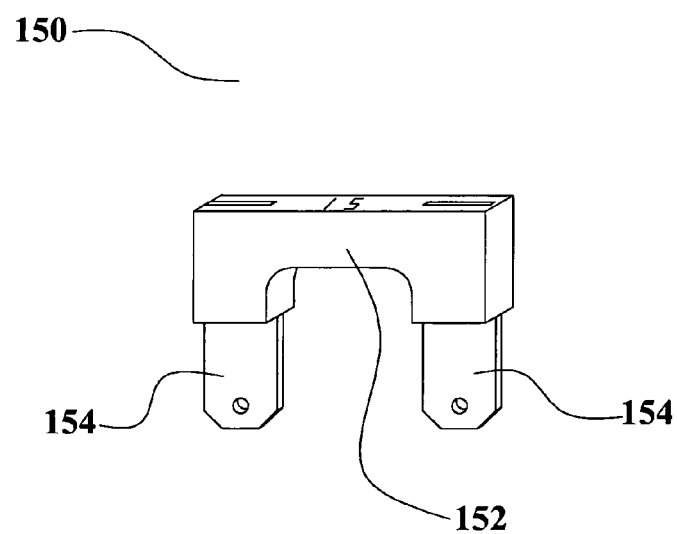
FIG. 12 illustrates a sixth preferred embodiment of the present invention showing a vehicle electrical fuse having various components comprising conductive loaded resin-based material according to the present invention.

Seventh, according to another embodiment of the present invention, the conductive loaded resin-based material is used to form electrical fuses 150 as shown in FIG. 12. Electrical fuses provide over-current protection for the various circuits in the vehicle. In the prior art, the fuses comprise a thin metal wire connected across two terminals. While intact, the thin metal wire completes the circuit between the terminals to allow operation of the protected circuit. When an over-current condition occurs, resistive heating occurs in the thin metal wire, due its relatively small diameter, until the wire opens due to metal melting or vaporization. At this point, the protected circuit opens and further over-current damage to components or to the entire vehicle is prevented. In the present invention, the thin metal wire and/or metal terminals are replaced with a thin fuse section 152 and terminals 154 of the conductive loaded resin-based material. The entire conductive fuse can easily be molded of the conductive loaded resin-based material and then over-molded or coated with an insulating material to facilitate installation/removal of the fuse 150.

Figure 14:
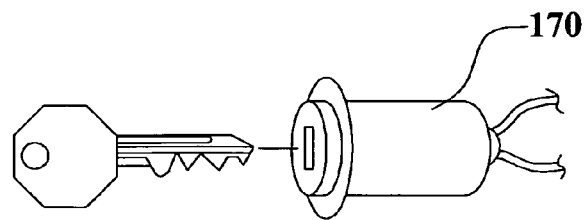
FIGS. 14 and 15 illustrate a eighth preferred embodiment of the present invention showing heated vehicle key locks with heating elements comprising conductive loaded resin-based material according to the present invention.
Figure 15:
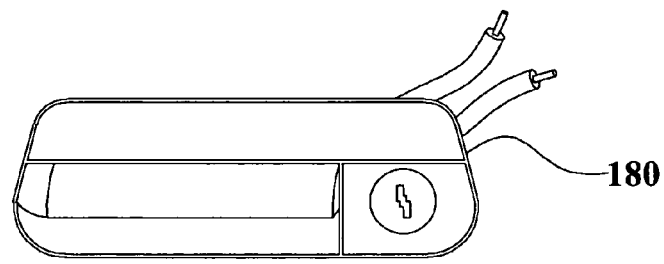

Eighth, according to another embodiment of the present invention, the conductive loaded resin-based material is used to form various resistive heating devices in the vehicle. In this application, the conductive loaded resin-based material provides a resistive heating element that can be easily molded into a large variety of shapes and forms. Two examples of applications for conductive loaded resin-based heater elements are shown as heated keylocks 170 in FIG. 13 and heated door handles 180 in FIG. 14. Heat keylocks 170 and door handles 180 are particularly useful for thawing internal and external ice that can prevent proper operation. Other similar applications include heated mirrors, steering wheels 20 (FIG. 1), and seats, and the like.

Figure 2:
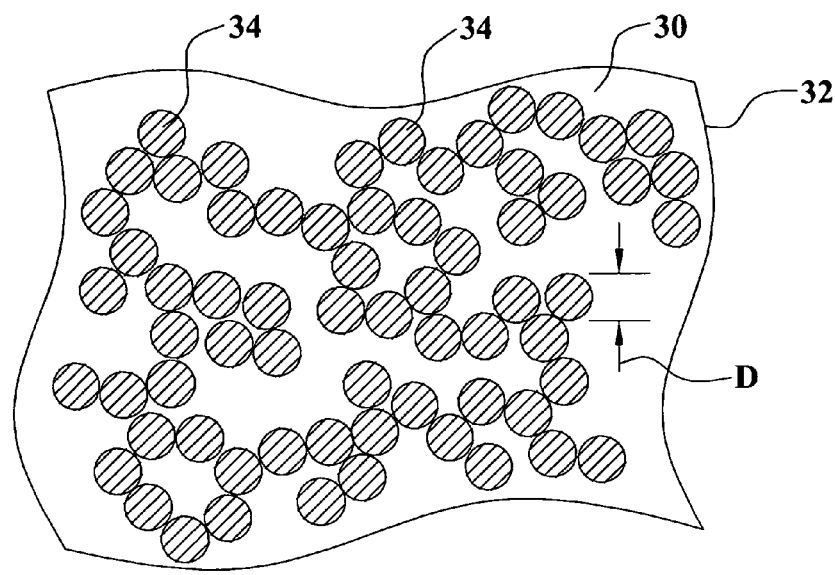
FIG. 2 illustrates a first preferred embodiment of a conductive loaded resin-based material wherein the conductive materials comprise a powder.

The conductive loaded resin-based material of the present invention typically comprises a micron powder(s) of conductor particles and/or in combination of micron fiber(s) substantially homogenized within a base resin host. FIG. 2 shows cross section view of an example of conductor loaded resin-based material 32 having powder of conductor particles 34 in a base resin host 30. In this example the diameter D of the conductor particles 34 in the powder is between about 3 and 12 microns.

Figure 3:
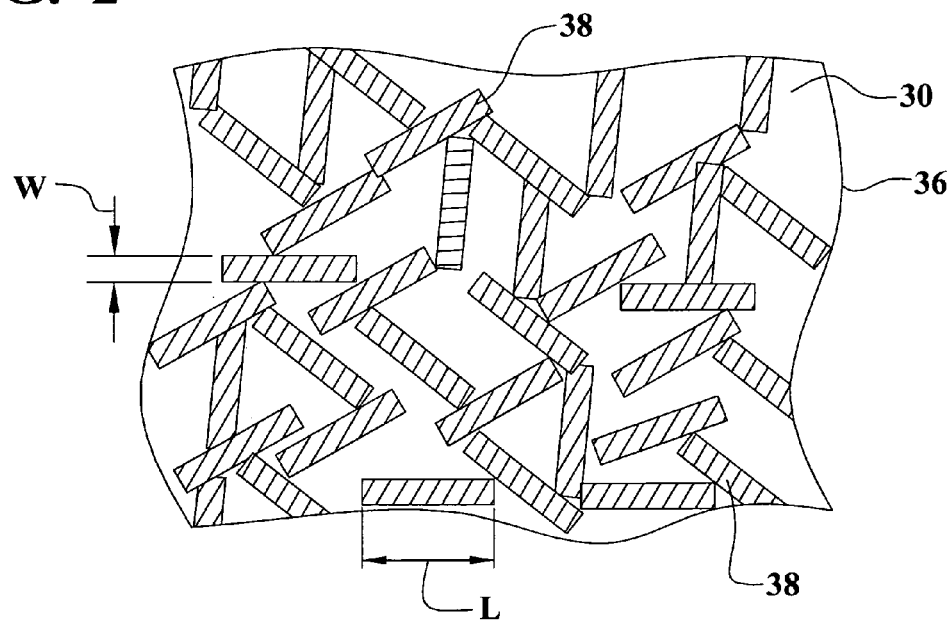
FIG. 3 illustrates a second preferred embodiment of a conductive loaded resin-based material wherein the conductive materials comprise micron conductive fibers.

FIG. 3 shows a cross section view of an example of conductor loaded resin-based material 36 having conductor fibers 38 in a base resin host 30. The conductor fibers 38 have a diameter of between about 3 and 12 microns, typically in the range of 10 microns or between about 8 and 12 microns, and a length of between about 2 and 14 millimeters. The micron conductive fibers 38 may be metal fiber or metal plated fiber. Further, the metal plated fiber may be formed by plating metal onto a metal fiber or by plating metal onto a non-metal fiber. Exemplary metal fibers include, but are not limited to, stainless steel fiber, copper fiber, nickel fiber, silver fiber, aluminum fiber, or the like, or combinations thereof. Exemplary metal plating materials include, but are not limited to, copper, nickel, cobalt, silver, gold, palladium, platinum, ruthenium, and rhodium, and alloys of thereof. Any platable fiber may be used as the core for a non-metal fiber. Exemplary non-metal fibers include, but are not limited to, carbon, graphite, polyester, basalt, man-made and naturally-occurring materials, and the like. In addition, superconductor metals, such as titanium, nickel, niobium, and zirconium, and alloys of titanium, nickel, niobium, and zirconium may also be used as micron conductive fibers and/or as metal plating onto fibers in the present invention.

Figure 4:
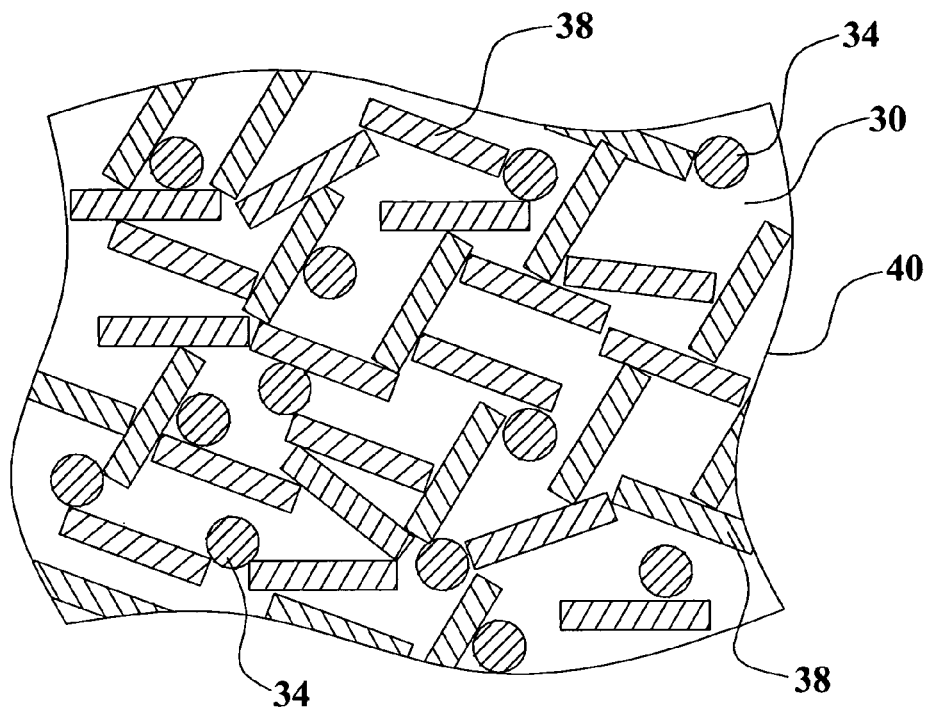
FIG. 4 illustrates a third preferred embodiment of a conductive loaded resin-based material wherein the conductive materials comprise both conductive powder and micron conductive fibers.

These conductor particles and/or fibers are substantially homogenized within a base resin. As previously mentioned, the conductive loaded resin-based materials have a sheet resistance between about 5 and 25 ohms per square, though other values can be achieved by varying the doping parameters and/or resin selection. To realize this sheet resistance the weight of the conductor material comprises between about 20% and about 50% of the total weight of the conductive loaded resin-based material. More preferably, the weight of the conductive material comprises between about 20% and about 40% of the total weight of the conductive loaded resin-based material. More preferably yet, the weight of the conductive material comprises between about 25% and about 35% of the total weight of the conductive loaded resin-based material. Still more preferably yet, the weight of the conductive material comprises about 30% of the total weight of the conductive loaded resin-based material. Stainless Steel Fiber of 6-12 micron in diameter and lengths of 4-6 mm and comprising, by weight, about 30% of the total weight of the conductive loaded resin-based material will produce a very highly conductive parameter, efficient within any EMF spectrum. Referring now to FIG. 4, another preferred embodiment of the present invention is illustrated where the conductive materials comprise a combination of both conductive powders 34 and micron conductive fibers 38 substantially homogenized together within the resin base 30 during a molding process.

Figure 5A:
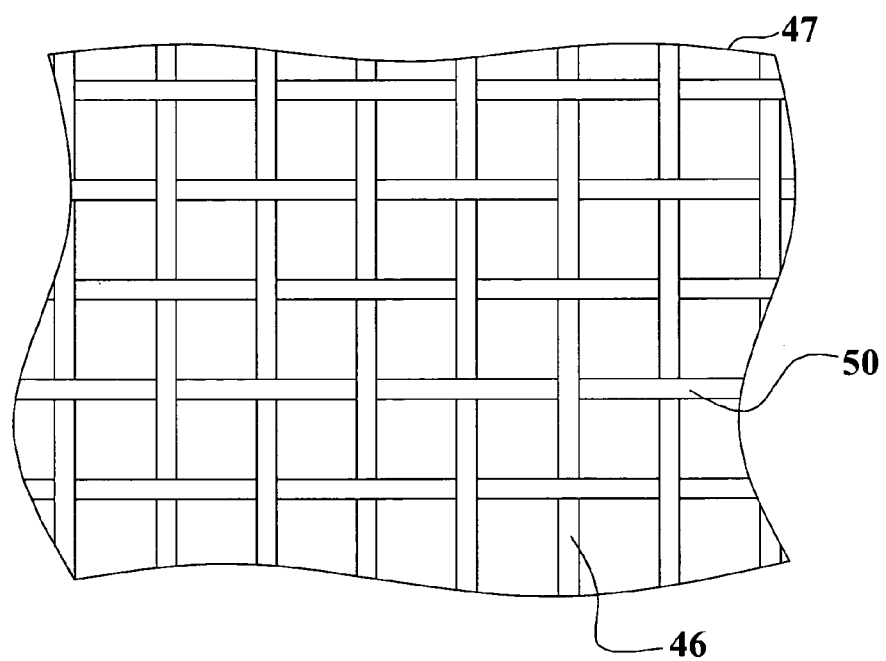

Referring now to FIGS. 5a and 5b, a preferred composition of the conductive loaded, resin-based material is illustrated. The conductive loaded resin-based material can be formed into fibers or textiles that are then woven or webbed into a conductive fabric. The conductive loaded resin-based material is formed in strands that can be woven as shown. FIG. 5a shows a conductive fabric 42 where the fibers are woven together in a two-dimensional weave 46 and 50 of fibers or textiles. FIG. 5b shows a conductive fabric 42' where the fibers are formed in a webbed arrangement. In the webbed arrangement, one or more continuous strands of the conductive fiber are nested in a random fashion. The resulting conductive fabrics or textiles 42, see FIG. 5a, and 42', see FIG. 5b, can be made very thin, thick, rigid, flexible or in solid form(s).

Similarly, a conductive, but cloth-like, material can be formed using woven or webbed micron stainless steel fibers, or other micron conductive fibers. These woven or webbed conductive cloths could also be sandwich laminated to one or more layers of materials such as Polyester(s), Teflon(s), Kevlar(s) or any other desired resin-based material(s). This conductive fabric may then be cut into desired shapes and sizes.

Vehicle electrical and electronic components formed from conductive loaded resin-based materials can be formed or molded in a number of different ways including injection molding, extrusion, calendaring, or chemically induced molding or forming. FIG. 6a shows a simplified schematic diagram of an injection mold showing a lower portion 54 and upper portion 58 of the mold 50. Conductive loaded blended resin-based material is injected into the mold cavity 64 through an injection opening 60 and then the substantially homogenized conductive material cures by thermal reaction. The upper portion 58 and lower portion 54 of the mold are then separated or parted and the vehicle electrical and electronic components are removed.

FIG. 6b shows a simplified schematic diagram of an extruder 70 for forming vehicle electrical and electronic components using extrusion. Conductive loaded resin-based material(s) is placed in the hopper 80 of the extrusion unit 74. A piston, screw, press or other means 78 is then used to force the thermally molten or a chemically induced curing conductive loaded resin-based material through an extrusion opening 82 which shapes the thermally molten curing or chemically induced cured conductive loaded resin-based material to the desired shape. The conductive loaded resin-based material is then fully cured by chemical reaction or thermal reaction to a hardened or pliable state and is ready for use. Thermoplastic or thermosetting resin-based materials and associated processes may be used in molding the conductive loaded resin-based articles of the present invention.

The advantages of the present invention may now be summarized. Effective vehicle electrical and electronics components are achieved. Methods to form vehicle electrical and electronic components are achieved. Vehicle electrical and electronic components are formed using conductive loaded resin-based material conductors. Vehicle electrical and electronic components are formed using conductive loaded resin-based material heating elements. Vehicle electrical and electronic components are formed using conductive loaded resin-based material heat dissipating devices. Vehicle electrical and electronic components are formed using conductive loaded resin-based material antennas. Vehicle electrical and electronic components are formed using conductive loaded resin-based material electromagnetic energy absorbers. Vehicle electrical and electronic components are molded of conductive loaded resin-based material. The electrical, thermal, or electromagnetic characteristics can be altered or the visual characteristics can be altered by forming a metal layer over the conductive loaded resin-based material. Methods to fabricate vehicle electrical and electronic components from the conductive loaded resin-based material incorporate various forms of the material.

As shown in the preferred embodiments, the novel methods and devices of the present invention provide an effective and manufacturable alternative to the prior art.

While the invention has been particularly shown and described with reference to the preferred embodiments thereof, it will be understood by those skilled in the art that various changes in form and details may be made without departing from the spirit and scope of the invention.

What is claimed is:

1. A vehicle electrical component device comprising:
a bottom plate; and
four sides joining to said bottom plate wherein said bottom plate and four sides comprise a conductive loaded, resin-based material consisting essentially of micron conductive fiber in a base resin host wherein the percent by weight of said conductive materials is between 20% and 40% of the total weight of said conductive loaded resin-based material wherein said micron conductive fiber has a diameter of between 3 μm and 11 μm and a length of between 5 mm and 10 mm.

2. The device according to claim 1 wherein said micron conductive fiber is nickel plated carbon micron fiber, stainless steel micron fiber, copper micron fiber, silver micron fiber or combinations thereof.

3. A vehicle electrical component device comprising:
a bottom plate; and
four sides joining to said bottom plate wherein said bottom plate and four sides comprise a conductive loaded, resin-based material consisting essentially of micron conductive fiber and conductive powder in a base resin host wherein the percent by weight of said conductive materials is between 20% and 40% of the total weight of said conductive loaded resin-based material wherein said micron conductive fiber has a diameter of between 3 μm and 11 μm and a length of between 5 mm and 10 mm.

4. The device according to claim 3 wherein said conductive powder is nickel, copper, or silver.

5. The device according to claim 3 wherein said conductive powder is a non-metallic material with a metal plating.

6. A vehicle electrical component device comprising:
a bottom plate; and
four sides joining to said bottom plate wherein said bottom plate and four sides comprise a conductive loaded, resin-based material consisting essential of micron conductive fiber in a base resin host wherein the percent by weight of said micron conductive fiber is between 20% and 40% of the total weight of said conductive loaded resin-based material and wherein said micron conductive fiber has a diameter of between 3 μm and 11 μm and a length of between 5 mm and 10 mm and wherein said micron conductive fiber is stainless steel.

* * * * *